US007012121B2

(12) United States Patent
Carnahan et al.

(10) Patent No.: US 7,012,121 B2
(45) Date of Patent: Mar. 14, 2006

(54) DELAYED ACTIVITY SUPPORTED OLEFIN POLYMERIZATION CATALYST COMPOSITIONS AND METHOD FOR MAKING AND USING THE SAME

(75) Inventors: Edmund M Carnahan, Fresno, TX (US); David R Neithamer, Midland, MI (US); Ravi B Shankar, Midland, MI (US)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/880,582

(22) Filed: Jul. 1, 2004

(65) Prior Publication Data

US 2004/0235646 A1 Nov. 25, 2004

Related U.S. Application Data

(63) Continuation of application No. 09/978,704, filed on Oct. 18, 2001, which is a continuation of application No. PCT/US00/08198, filed on Mar. 28, 2000.

(60) Provisional application No. 60/130,166, filed on Apr. 20, 1999.

(51) Int. Cl.
*C08F 4/44* (2006.01)
*C08F 4/06* (2006.01)

(52) U.S. Cl. ....................... 526/134; 526/161; 526/172

(58) Field of Classification Search ................ 526/134, 526/161, 172

See application file for complete search history.

(56) References Cited

U.S. PATENT DOCUMENTS

| | | | | |
|---|---|---|---|---|
| 5,272,236 A | 12/1993 | Lai et al. | 502/152 |
| 5,470,993 A | 11/1995 | Devore et al. | 556/11 |
| 5,556,928 A * | 9/1996 | Devore et al. | 526/127 |
| 5,770,538 A * | 6/1998 | Devore et al. | 502/117 |
| 6,268,444 B1 * | 7/2001 | Klosin et al. | 526/127 |
| 6,376,406 B1 * | 4/2002 | Ashe et al. | 502/103 |

FOREIGN PATENT DOCUMENTS

| | | |
|---|---|---|
| WO | WO96/28480 | 9/1996 |
| WO | WO00/63262 | 10/2000 |

* cited by examiner

*Primary Examiner*—J. A. Lorengo
*Assistant Examiner*—J. Pasterczyk
(74) *Attorney, Agent, or Firm*—Finnegan, Henderson, Farabow, Garrett and Dunner, L.L.P.

(57) ABSTRACT

Supported catalyst compositions use for use in the gas-phase polymerization of one or more α-olefins and methods for making and using the same, the catalyst composition including A) an inert support; B) a Group 4–10 metal complex corresponding to the formula:

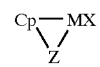

where M is a metal from one of Groups 4 to 10 of the Periodic Table of the Elements in the +2 or +4 formal oxidation state, Cp is a π-bonded anionic ligand group, Z is divalent moiety bound to Cp and bound to M by either covalent or coordinate/covalent bonds and contains boron or a member of Group 14 of the Periodic Table of the Elements, and also nitrogen, phosphorus, sulfur or oxygen, and X is a neutral conjugated diene ligand group having up to 60 atoms, or a dianionic derivative thereof; and C) an ionic cocatalyst capable of converting the metal complex into an active polymerization catalyst represented by the formula:

$$[L^*\text{-}H]^+[(C_6F_5)_3BC_6H_4\text{—}O\text{—}M^O R^C_{x-1} X^a_y]^-,$$

wherein L* is a neutral Lewis base, $M^o$ is a metal or metalloid selected from Groups 1–14 of the Periodic Table of the Elements, $R^C$ independently each occurrence is a hydrogen or a hydrocarbyl, hydrocarbylsilyl, or hydrocarbysilylhydrocarbyl group having from 1 to 80 nonhydrogen atoms; $X^a$ is a halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide noninterfering group having from 1 to 100 nonhydrogen atoms; x is an integer which ranges from 1 to an integer equal to the valence of $M^O$; y is an integer which ranges from 0 to an integer equal to 1 less than the valence of $M^O$; and x+y equals the valence of $M^O$.

2 Claims, No Drawings

DELAYED ACTIVITY SUPPORTED OLEFIN POLYMERIZATION CATALYST COMPOSITIONS AND METHOD FOR MAKING AND USING THE SAME

CROSS REFERENCE TO RELATED APPLICATIONS

This application is a continuation of U.S. application Ser. No. 09/978,704, filed Oct. 18, 2001, which is a continuation of international application number PCT/US00/08198, filed Mar. 28, 2000, and claims the benefit of U.S. Provisional Application No. 60/130,166, filed Apr. 20, 1999, the contents of all of which are incorporated herein by reference.

Olefin polymerization catalysts used in gas phase processes are typically supported on a carrier in order to obtain a polymer of acceptable morphology. Desirably, the polymer particles will have low fines (defined as particles having a particle size <125 μm) and low agglomerates (defined as particles having a particle size >1500 μm) and be of acceptable bulk density (>0.3 g/mL). While the high activity characteristic of metallocene and constrained geometry catalysts is advantageous from a productivity perspective, polymer morphology problems may result because the supported catalyst is at peak activity when it is injected into the reactor. This can result in too rapid polymerization and severe fracturing of the catalyst particles leading to the generation of unacceptable quantities of fines, or a combination thereof high exotherms leading to agglomerate formation. In addition, fouling of the catalyst injector can occur leading to premature need to stop the polymerization and clean the injector.

In contrast, traditional Ziegler-Natta catalysts do not achieve peak activity until after the catalyst has been injected into the reactor. This difference is in part attributed to the fact that addition of a cocatalyst, such as triethylaluminum, to the reactor can result in delayed catalyst activation. See, for instance, Boor, John Jr., *Ziegler-Natta Catalysts and Polymerizations,* 1979, Academic Press, N.Y., Chapter 18: Kinetics.

To control the polymerization of at least one α-olefin by a constrained geometry or metallocene catalyst in a gas phase polymerization process, an in-reactor method of metal complex activation would be advantageous. However, this is problematic, due to the fact that typical metal complexes and cocatalysts used for olefin polymerization readily form extremely active polymerization catalysts.

U.S. Pat. No. 5,693,727 discloses the addition of catalyst components into a reactor as a liquid spray. This patent provides that all or a portion of the co-catalyst can be fed separately from the metal compound(s) to the reactor. This patent does not exemplify supported catalysts.

U.S. Pat. No. 5,763,349 describes mixing a metallocene halide and a cocatalyst on a support. Subsequent addition of a metal alkyl was then employed to generate the active catalyst. U.S. Pat. No. 5,763,349 similarly teaches the introduction of a metal alkyl to the reactor to achieve activation.

WO 95/10542 discloses the addition of catalyst and cocatalysts supported separately on two different carriers. Prior to introduction into the reactor, the supported metallocene halide/cocatalyst have minimal if any catalytic activity, indicating that all activation occurs in the reactor. This technology relies upon in-reactor migration of either the metal complex or the cocatalyst from one particle to the other to achieve activation, which may lead to product morphology problems.

It is known that Ti(II) and Zr(II) diene complexes such as are disclosed in U.S. Pat. No. 5,470,993 (incorporated herein by reference in its entirety) can be activated by trispentafluorophenylborane or borate cocatalysts. These catalyst compositions often exhibit extremely high initial polymerization rates, high exotherms, and decaying reaction kinetic profiles in a batch reactor.

Those in industry would find great advantage in fully formulated supported catalyst composition for the gas-phase polymerization of α-olefins that has exhibits delayed onset of polymerization, improved reaction kinetic profile, and high productivity over an increased catalyst lifetime, while generating a polymer product characterized by reduced fines and agglomerates.

All references herein to elements belonging to a certain Group refer to the Periodic Table of the Elements published and copyrighted by CRC Press, Inc., 1995. Also any reference to the Group or Groups shall be to the Group or Groups as reflected in this Periodic Table of the Elements using the IUPAC system for numbering groups. The full teaching of any patent, patent application, provisional application, or publication referred to herein is hereby.

SUMMARY OF THE INVENTION

The subject invention provides a supported catalyst composition for use in the gas-phase polymerization of one or more α-olefins and methods for making and using the same, said catalyst composition comprising:

A) an inert support,

B) a Group 4–10 metal complex corresponding to the formula:

where M is a metal from one of Groups 4 to 10 of the Periodic Table of the Elements, which is in the +2 or +4 formal oxidation state, Cp is a π-bonded anionic ligand group Z is a divalent moiety bound to Cp and bound to M by either covalent or coordinate/covalent bonds, comprising boron or a member of Group 14 of the Periodic Table of the Elements, and also comprising nitrogen, phosphorus, sulfur or oxygen;

X is a neutral conjugated diene ligand group having up to 60 atoms, or a dianionic derivative thereof; and C) an ionic cocatalyst capable of converting the metal complex into an active polymerization catalyst, wherein said catalyst composition is characterized as having an improved kinetic profile in a gas phase polymerization process.

In one embodiment, the invention provides a supported catalyst composition as previously identified having a kinetic profile in a batch reactor, gas phase polymerization of one or more α-olefins that obeys the following relationship:

$$K_r = A_{30}/A_{90} \leqq 1.6$$

where $K_r$ is the ratio of the cumulative net catalyst activity 30 minutes after onset of polymerization ($A_{30}$) divided by the cumulative net catalyst activity 90 minutes after onset of polymerization ($A_{90}$). $A_{30}$ and $A_{90}$ are determined by calculating the grams polymer/gram supported catalyst composition×time (hr)×total monomer pressure (100 kPa).

In another embodiment, the invention provides supported catalyst compositions and methods for making and using the same wherein the supported catalyst composition, when injected into a gas phase polymerization reactor, and contacted with one or more α-olefin monomers, demonstrates a $K_r$ which is at least 10 percent less than $K^*_r$, where $K^*_r$ is the ratio of cumulative net catalyst activity for a comparative supported catalyst composition prepared using the metal complex (t-butylamido)dimethyl(tetramethylcyclo-pentadienyl)silanetitanium(II) 1,3-pentadiene and a cocatalyst comprising armenium (diethylaluminumoxyphenyl)tris-(pentafluorophenyl)borate.

DETAILED DESCRIPTION OF THE INVENTION

The subject invention provides a fully formulated supported constrained geometry catalyst composition which exhibits high productivity over an increased catalyst lifetime. In particular, through the selection of a metal complex with a suitable diene ligand in combination with an appropriate cocatalyst, it has been found that, in contrast to known compositions which are characterized as exhibiting a high initial catalytic activity followed by a period of decreasing catalytic activity, the present compositions exhibit an improved kinetic profile over at least the first ninety minutes of polymerization. More specifically, the catalyst compositions may exhibit an initial catalyst activity that is less exothermic than for comparative catalyst compositions. Additionally, the catalyst activity may also increase over a longer period of time that for comparative catalyst compositions. Finally, the catalyst activity ultimately may decrease under batch reactor conditions at a rate that is less than that for comparative catalyst compositions.

Suitable metal complexes may be derivatives of any transition metal, preferably Group 4 metals that are in the +2. or +4 formal oxidation state. Preferred compounds include constrained geometry metal complexes containing one π-bonded anionic ligand group, which may be cyclic or noncyclic delocalized π-bonded anionic ligand groups. Exemplary of such π-bonded anionic ligand groups are conjugated or nonconjugated, cyclic or non-cyclic dienyl groups, allyl groups, boratabenzene groups, and arene groups. By the term "π-bonded" is meant that the ligand group is bonded to the transition metal by means of delocalized electrons present in a π bond.

Each atom in the delocalized π-bonded group may independently be substituted with a radical selected from the group consisting of hydrogen, halogen, hydrocarbyl, halohydrocarbyl, Group 15 or 16 heteroatom-containing radicals, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 heteroatom containing moiety. Included within the term "hydrocarbyl" are $C_1$–$C_{20}$ straight, branched and cyclic alkyl radicals, $C_6$–$C_{20}$ aromatic radicals, $C_7$–$C_{20}$ alkyl-substituted aromatic radicals, and $C_7$–$C_{20}$ aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyidimethylsilyl, methyldiethyl-silyl, triphenylgermyl, and trimethylgermyl groups. Examples of Group 15 or 16 hetero atom containing moieties include amine, phosphine, ether or thioether moieties or divalent derivatives thereof, e. g. amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include but are not limited to cyclopentadienyl, indenyl, fluorenyl, tetrahydroindenyl, tetrahydrofluorenyl, octahydrofluorenyl, pentadienyl, dimethylcyclohexadienyl, dimethyldihydroanthracenyl, dimethylhexahydroanthracenyl, demethyldecahydroanthracenyl groups, and boratabenzene groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, tetramethylcyclopentadienyl, indenyl, 2,3-dimethylindenyl, fluorenyl, 2-methylindenyl, 2-methyl-4-phenylindenyl, tetrahydrofluorenyl, octahydrofluorenyl, tetrahydroindenyl, 2-methyl-s-indacenyl, 3-(N-pyrrolidinyl) indenyl, and cyclopenta(I)phenanthrenyl.

The boratabenzenes are anionic ligands which are boron containing analogues to benzene. They are previously known in the art having been described by G. Herberich, et al., in *Organometallics,* 1995, 14, 1, 471–480. Preferred boratabenzenes correspond to the formula:

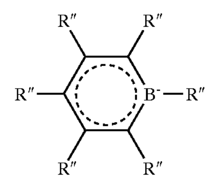

wherein each R" is independently selected from the group consisting of hydrocarbyl, silyl, or germyl radicals, each said R" having up to 20 non-hydrogen atoms, and being optionally substituted with a group containing a Group 15 or 16 element. In complexes involving divalent derivatives of such delocalized π-bonded groups one atom thereof is bonded by means of a covalent bond or a covalently bonded divalent group to another atom of the complex thereby forming a bridged system.

A preferred class of such Group 4 metal coordination complexes used according to the present invention correspond to the formula:

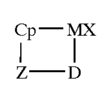

wherein Cp is an anionic, delocalized, π-bonded group that is bound to M, containing up to 50 nonhydrogen atoms;

M is a metal of Group 4 of the Periodic Table of the Elements in the +2 or +4 formal oxidation state;

X is a $C_{4-30}$ conjugated diene represented by the formula:

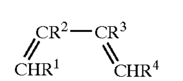

wherein $R^1$, $R^2$, $R^3$, and $R^4$ are each independently hydrogen, aromatic, substituted aromatic, fused aromatic, substituted fused aromatic, aliphatic, substituted aliphatic, heteroatom-containing aromatic, heteroatom-containing fused aromatic, or silyl radical;

D is —O—, —S—, —NR—, or —PR—; and

Z is $SiR_2$, $CR_2$, $SiR_2SiR_2$, $CR_2CR_2$, CR═CR, $CR_2SiR_2$, or $GeR_2$, $BR_2$, $B(NR_2)_2$, $BR_2BR_2$, $B(NR_2)_2B(NR_2)_2$, wherein R is in each occurrence independently selected from the group consisting of hydrogen, hydrocarbyl, silyl, germyl, cyano, halo and combinations thereof, said R having up to 20 non-hydrogen atoms, or adjacent R groups together form a divalent derivative (that is, a hydrocarbadiyl, siladiyl or germadiyl group) thereby forming a fused ring system.

A more preferred class of such Group 4 metal coordination complexes used according to the present invention correspond to the formula:

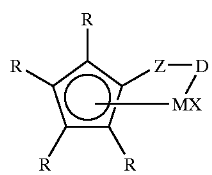

wherein:

M is titanium or zirconium in the +2 or +4 formal oxidation state;

X is a $C_{5-30}$ conjugated diene represented by the formula:

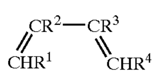

wherein $R^1$, $R^2$, $R^3$, and $R^4$ are each independently hydrogen, aromatic, substituted aromatic, fused aromatic, substituted fused aromatic, aliphatic, substituted aliphatic, heteroatom-containing aromatic, heteroatom-containing fused aromatic, or silyl radical;

D is —O—, —S—, —NR*—, or —PR*—; and

Z is $SiR^*_2$, $CR^*_2$, $SiR^*_2SiR^*_2$, $CR^*_2CR^*_2$, CR*═CR*, $CR^*_2SiR^*_2$, or $GeR^*_2$,

R and R* are in each occurrence is independently selected from the group consisting of hydrogen, hydrocarbyl, silyl, germyl, cyano, halo and combinations thereof, said R having up to 20 non-hydrogen atoms, or adjacent R groups together form a divalent derivative (that is, a hydrocarbadiyl, siladiyl or germadiyl group) thereby forming a fused ring system.

Illustrative Group 4 metal complexes that may be employed in the practice of the present invention include:

(tert-butylamido)(tetramethyl-$\eta^5$-cyclopentadienyl)dimethylsilanetitanium (II) 1,4-diphenyl-1,3-butadiene, (tert-butylamido)(2-methylindenyl)dimethylsilanetitanium (II) 1,4-diphenyl-1,3-butadiene, (tert-butylamido)(2-methylindenyl)dimethylsilanetitanium (IV) 1,3-butadiene, (tert-butylamido)(2,3-dimethylindenyl)dimethylsilanetitanium (II) 1,4-diphenyl-1,3-butadiene, (tert-butylamido)(2,3-dimethylindenyl)dimethylsilanetitanium (IV) 1,3-butadiene, (tert-butylamido)(2,3-dimethylindenyl)dimethylsilanetitanium (II) 1,3-pentadiene, (tert-butylamido)(2-methylindenyl)dimethylsilanetitanium (II) 1,3-pentadiene, (tert-butylamido)(2-methyl-4-phenylindenyl)dimethylsilanetitanium (II) 1,4-diphenyl-1,3-butadiene, (tert-butylamido)(tetramethyl-$\eta^5$-cyclopentadienyl)dimethylsilanetitanium (IV) 1,3-butadiene, (tert-butylamido)(tetramethyl-$\eta^5$-cyclopentadienyl)dimethylsilanetitanium (II) 1,4-dibenzyl-1,3-butadiene, (tert-butylamido)(tetramethyl-$\eta^5$-cyclopentadienyl)dimethylsilanetitanium (II) 2,4-hexadiene, (tert-butylamido)(tetramethyl-$\eta^5$-cyclopentadienyl)dimethylsilanetitanium (II) 3-methyl 1,3-pentadiene, (tert-butylamido)(tetramethylcyclopentadienyl)dimethylsilanetitanium 1,3-pentadiene, (tert-butylamido)(3-(N-pyrrolidinyl)inden-1-yl)dimethylsilanetitanium 1,3-pentadiene, (tert-butylamido)(2-methyl-s-indacen-1-yl)dimethylsilanetitanium 1,3-pentadiene, and (tert-butylamido)(3,4-cyclopenta(/)phenanthren-2-yl)dimethylsilanetitanium 1,4-diphenyl-1,3-butadiene.

Suitable activating cocatalysts for use herein include ion forming compounds (including the use of such compounds under oxidizing conditions), especially the use of ammonium-, phosphonium-, oxonium-, carbonium, silylium-, sulfonium-, or ferrocenium-salts of compatible, noncoordinating anions, Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 20 carbons in each hydrocarbyl or halogenated hydrocarbyl group, more especially perfluorinated tri(aryl)boron compounds, and most especially tris(pentafluorophenyl)borane, and combinations of the foregoing activating cocatalysts. The foregoing activating cocatalysts have been previously taught with respect to different metal complexes in the following references: U.S. Pat. Nos. 5,132,380, 5,153,157, 5,064,802, 5,321,106, 5,721,185, and 5,350,723.

Combinations of Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such Lewis acid mixtures with a polymeric or oligomeric alumoxane, and combinations of a single neutral Lewis acid, especially tris(pentafluorophenyl)borane with a polymeric or oligomeric alumoxane may also be used.

Suitable ionic compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a Lewis bases such as olefin monomer. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a coordination complex comprising one or more charge-bearing metal or metalloid atoms which anion is capable of balancing the charge of the active catalyst species (the metal cation) which may be formed when the two components are combined. Also, said anion should be sufficiently labile to be displaced by olefinic, diolefinic and acetylenically unsaturated compounds or other Lewis bases such as ethers or nitrites. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*\text{-}H)_d^+(A')^{d-}$$

wherein:

L* is a neutral Lewis base;

$(L^*\text{-}H)^+$ is a Bronsted acid;

$A'^{d-}$ is a noncoordinating, compatible anion having a charge of $d^-$, and d is an integer from 1 to 3.

More preferably $A'^{d-}$ corresponds to the formula:

$$[M^*Q_4]^{31};$$

wherein:

M* is boron or aluminum in the +3 formal oxidation state; and

Q independently each occurrence is selected from hydride, dialkylamido, halide, hydrocarbyl, halohydrocarbyl, halocarbyl, hydrocarbyloxide, hydrocarbyloxy substituted-hydrocarbyl, organometal-substituted hydrocarbyl, organometalloid substituted-hydrocarbyl, organometal-substituted hydocarbyloxy, halohydrocarbyloxy, halohydrocarbyloxy substituted hydrocarbyl, halocarbyl-substituted hydrocarbyl, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable Q groups are disclosed in U.S. Pat. No. 5,296,433 and WO 98/27119, as well as elsewhere. In a more preferred embodiment, d is one, that is, the counter ion has a single negative charge and is $A'^-$. Activating cocatalysts comprising boron which are particularly useful in the preparation of catalysts of this invention may be represented by the following general formula:

$$(L^*\text{-}H)^+(BQ_4)^-;$$

wherein:

L* is as previously defined;

B is boron in a formal oxidation state of 3; and

Q is a hydrocarbyl-, hydrocarbyloxy-, organometal-substituted hydrocarbyloxy, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Most preferably, Q is each occurrence a fluorinated aryl group, or dialkylaluminumoxyphenyl group, especially, a pentafluorophenyl group or diethylaluminumoxyphenyl group.

Illustrative, but not limiting, examples of boron compounds which may be used as an activating cocatalyst in the preparation of the improved catalysts of this invention are tri-substituted ammonium salts such as:

trimethylammonium tetraphenylborate,
methyldioctadecylammonium tetraphenylborate,
triethylammonium tetraphenylborate,
tripropylammonium tetraphenylborate,
tri(n-butyl)ammonium tetraphenylborate,
methyltetradecyloctadecylammonium tetraphenylborate,
N,N-dimethylanilinium tetraphenylborate,
N,N-diethylanilinium tetraphenylborate,
N,N-dimethyl(2,4,6-trimethylanilinium) tetraphenylborate,
trimethylammonium tetrakis(pentafluorophenyl)borate,
methylditetradecylammonium tetrakis(pentafluorophenyl)borate,
methyidioctadecylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-trimethylanilinium)tetrakis(pentafluorophenyl)borate,
trimethylammonium tetrakis(2,3,4,6-tetrafluorophenyl)borate,
triethylammonium tetrakis(2,3,4,6-tetrafluorophenyl)borate,
tripropylammonium tetrakis(2,3,4,6-tetrafluorophenyl)borate,
tri(n-butyl)ammonium tetrakis(2,3,4,6-tetrafluorophenyl)borate,
dimethyl(t-butyl)ammonium tetrakis(2,3,4,6-tetrafluorophenyl)borate,
N,N-dimethylanilinium tetrakis(2,3,4,6-tetrafluorophenyl)borate,
N,N-diethylanilinium tetrakis(2,3,4,6-tetrafluorophenyl)borate, and
N,N-dimethyl-(2,4,6-trimethylanilinium)tetrakis-(2,3,4,6-tetrafluorophenyl)borate.

Dialkyl ammonium salts such as:

dioctadecylammonium tetrakis(pentafluorophenyl)borate,
ditetradecylammonium tetrakis(pentafluorophenyl)borate, and
dicyclohexylammonium tetrakis(pentafluorophenyl)borate.

Tri-substituted phosphonium salts such as:

triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate.

Preferred are those cocatalysts which are referred to in this application as armeenium salts of boron containing anions, more particularly, triammonium salts, containing one or two $C_{14}$–$C_{20}$ alkyl groups on the ammonium cation and anions which are tetrakispentafluorophenylborate. Especially preferred armeenium salt cocatalysts are methyldi(octadecyl)ammonium tetrakis(pentafluorophenyl)borate and methyldi(tetradecyl)ammonium tetrakis(pentafluorophenyl)borate, or mixtures including the same Such mixtures include protonated ammonium cations derived from amines comprising two $C_{14}$, $C_{16}$ or $C_{18}$ alkyl groups and one methyl group. Such amines are referred to herein as armeens and the cationic derivatives thereof are referred to as armeenium cations. They are available from Witco Corp., under the trade name Kemamine™ T9701, and from Akzo-Nobel under the trade name Armeen™ M2HT.

Another suitable ammonium salt, especially for use in heterogeneous catalyst compositions is formed upon reaction of a organometal or organometalloid compound, especially a tri($C_{1-6}$alkyl)aluminum compound with an ammonium salt of a hydroxyaryltris(fluoroaryl)borate compound. The resulting compound is an organometaloxyaryltris(fluoroaryl)borate compound which is generally insoluble in aliphatic liquids. Typically, such compounds are advantageously precipitated on support materials, such as silica, alumina or trialkylaluminum passivated silica, to form a supported cocatalyst mixture. Examples of suitable compounds include the reaction product of a tri($C_{1-6}$ alkyl) aluminum compound with the ammonium salt of hydroxyaryltris(fluoroaryl)borate. Exemplary fluoroaryl groups include perfluorophenyl, perfluoronaphthyl, and perfluorobiphenyl.

Examples of such a cocatalyst are those represented by the formula:

$$[L^*\text{-}H]^+[(C_6F_5)_3BC_6H_4\text{—}O\text{-}M^O R^C_{x-1} X^a_y]^-,$$

$L^*$ is a neutral Lewis base, $M^O$ is a metal or metalloid selected from Groups 1–14 of the Periodic Table of the Elements, $R^c$ independently each occurrence is hydrogen or a group having from 1 to 80 nonhydrogen atoms which is hydrocarbyl, hydrocarbylsilyl, or hydrocarbylsilylhydrocarbyl;

$X^a$ is a noninterfering group having from 1 to 100 nonhydrogen atoms which is halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide;

x is a nonzero integer which may range from 1 to an integer equal to the valence of $M^O$;

y is zero or a nonzero integer which may range from 1 to an integer equal to 1 less than the valence of $M^O$; and x+y equals the valence of $M^O$.

Particularly preferred hydroxyaryltris(fluoroaryl)-borates include the ammonium salts, especially the forgoing armeenium salts of:

(4-dimethylaluminumoxy-1-phenyl)tris(pentafluorophenyl)borate, (4-dimethylaluminumoxy-3,5-di(trimethylsilyl)-1-phenyl)tris(pentafluorophenyl)borate, (4-dimethylaluminumoxy-3,5-di(t-butyl)-1-phenyl)tris(pentafluorophenyl)borate, (4-dimethylaluminumoxy-1-benzyl)tris(pentafluorophenyl)borate, (4-dimethylaluminumoxy-3-methyl-1-phenyl)tris(pentafluorophenyl)borate, (4-dimethylaluminumoxy-tetrafluoro-1-phenyl)tris(pentafluorophenyl)borate, (5-dimethylaluminumoxy-2-naphthyl)tris(pentafluorophenyl)borate, 4-(4-dimethylaluminumoxy-1-phenyl)phenyltris(pentafluorophenyl)borate, 4-(2-(4-(dimethylaluminumoxyphenyl)propane-2-yl)phenyloxy)tris(pentafluorophenyl)borate, (4-diethylaluminumoxy-1-phenyl)tris(pentafluorophenyl)borate, (4-diethylaluminumoxy-3,5-di(trimethylsilyl)-1-phenyl)tris(pentafluorophenyl)borate, (4-diethylaluminumoxy-3,5-di(t-butyl)-1-phenyl)tris(pentafluorophenyl)borate, (4-diethylaluminumoxy-1-benzyl)tris(pentafluorophenyl)borate, (4-diethylaluminumoxy-3-methyl-1-phenyl)tris(pentafluorophenyl)borate, (4-diethylaluminumoxy-tetrafluoro-1-phenyl)tris(pentafluorophenyl)borate, (5-diethylaluminumoxy-2-naphthyl)tris(pentafluorophenyl)borate, 4-(4-diethylaluminumoxy-1-phenyl)phenyltris(pentafluorophenyl)borate, 4-(2-(4-(diethylaluminumoxyphenyl)propane-2-yl)phenyloxy)tris(pentafluorophenyl)borate, (4-diisopropylaluminumoxy-1-phenyl)tris(pentafluorophenyl)borate, (4-diisopropylaluminumoxy-3,5-di(trimethylsilyl)-1-phenyl)tris(pentafluorophenyl)borate, (4-diisopropylaluminumoxy-3,5-di(t-butyl)-1-phenyl)tris(pentafluorophenyl)borate, (4-diisopropylaluminumoxy-1-benzyl)tris(pentafluorophenyl)borate, (4-diisopropylaluminumoxy-3-methyl-1-phenyl)tris(pentafluorophenyl)borate, (4-diisopropylaluminumoxy-tetrafluoro-1-phenyl)tris(pentafluorophenyl)borate, (5-diisopropylaluminumoxy-2-naphthyl)tris(pentafluorophenyl)borate, 4-(4-diisopropylaluminumoxy-1-phenyl)phenyltris(pentafluorophenyl)borate, and 4-(2-(4-(diisopropylaluminumoxyphenyl)propane-2-yl)phenyloxy)tris(pentafluorophenyl)borate.

An especially preferred ammonium compound is methyldi(tetradecyl)ammonium (4-diethylaluminumoxy-1-phenyl)tris(pentafluorophenyl)borate, methyldi(hexadecyl)ammonium (4-diethylaluminumoxy-1-phenyl)tris(pentafluorophenyl)borate, methyldi(octadecyl)ammonium (4-diethylaluminumoxy-1-phenyl)tris(pentafluorophenyl)borate, and mixtures thereof. The foregoing complexes are disclosed in WO96/28480, which is equivalent to U.S. Ser. No. 08/610,647, filed Mar. 4, 1996, and in U.S. Ser. No. 08/768,518, filed Dec. 18, 1996.

Another suitable activating cocatalyst comprises a salt of a cationic oxidizing agent and a noncoordinating, compatible anion represented by the formula:

$(Ox^{\bullet+})_d(A'^{d-})_e$, wherein $Ox^{e+}$ is a cationic oxidizing agent having a charge of e+;

e is an integer from 1 to 3; and $A'^{d-}$ and d are as previously defined.

Examples of cationic oxidizing agents include: ferrocenium, hydrocarbyl-substituted ferrocenium, $Ag^+$ or $Pb^{+2}$. Preferred embodiments of $A'^{d-}$ are those anions previously defined with respect to the Bronsted acid containing activating cocatalysts, especially tetrakis(pentafluorophenyl)borate.

Another suitable activating cocatalyst comprises a compound which is a salt of a carbenium ion and a noncoordinating, compatible anion represented by the formula:

$©^+A'^-$ wherein:

$©^+$ is a $C_{1-20}$ carbenium ion; and $A'^-$ is a noncoordinating, compatible anion having a charge of −1. A preferred carbenium ion is the trityl cation, that is triphenylmethylium.

A further suitable activating cocatalyst comprises a compound which is a salt of a silylium ion and a noncoordinating, compatible anion represented by the formula:

$R_3SiX'_nA'^-$ wherein:

R is $C_{1-10}$ hydrocarbyl;

X' is a Lewis base;

n is 0, 1 or 2, and $A'^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.,* 1993, 383–384, as well as Lambert, J. B., et al., *Organometallics,* 1994, 13, 2430–2443. The use of the above silylium salts as activating cocatalysts for addition polymerization catalysts is claimed in U.S. Pat. No. 5,625,087.

Certain complexes of alcohols, mercaptans, silanols, and oximes with tris(pentafluorophenyl)borane are also effective cocatalysts and may be used according to the present invention. Such cocatalysts are disclosed in U.S. Pat. No. 5,296,433.

In one preferred embodiment, the cocatalyst will comprise a compound corresponding to the formula:

$$(A^{+a})_b(EJ_j)^{-c}_d,$$

wherein:

A is a cation of charge +a,

E is an anion group of from 1 to 30 atoms, not counting hydrogen atoms, further containing two or more Lewis base sites;

J independently each occurrence is a Lewis acid coordinated to at least one Lewis base site of E, and optionally two of more such J groups may be joined together in a moiety having multiple Lewis acidic functionality, j is a number from 2 to 12 and a, b, c, and d are integers from 1 to 3, with the proviso that a×b is equal to c×d. Such compounds are disclosed and claimed in U.S. Ser. No. 09/251,664, filed Feb. 17, 1999.

Examples of most highly preferred cocatalysts of this class are substituted imidizolide anions having the following structures:

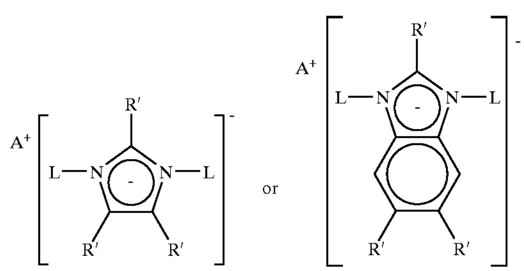

wherein:

A+ is as previously defined, and preferably is a trihydrocarbyl ammonium cation, containing one or two $C_{10\text{-}40}$ alkyl groups, especially, methyldioctadecylammonium cation, R' is in each occurrence is independently selected from the group consisting of hydrogen, hydrocarbyl, silyl, germyl, cyano, halo and combinations thereof, each said R' having up to 30 non-hydrogen atoms (especially methyl or a $C_{10}$ or higher hydrocarbyl group), and L is a trisfluoroarylboron or trisfluoroarylaluminum compound containing three $C_{5\text{-}20}$ fluoroaryl- groups, especially pentafluorophenyl groups.

The molar ratio of catalyst/cocatalyst employed preferably ranges from 1:10 to 10:1, more preferably from 1:5 to 5:1, most preferably from 1:1.5 to 1.5:1. Preferably, the catalyst and activating cocatalyst are present on the support in an amount of from 5 to 200, more preferably from 10 to 75 micromoles per gram of support.

Preferred supports for use in the present invention include highly porous silicas, aluminas, aluminosilicates, and mixtures thereof. The most preferred support material is silica. The support material may be in granular, agglomerated, pelletized, or any other physical form. Suitable materials include, but are not limited to, silicas available from Grace Davison (division of W. R. Grace & Co.) under the designations SD 3216.30, Davison Syloid 245, Davison 948 and Davison 952, and from Crossfield under the designation ES70, and from Degussa AG under the designation Aerosil 812; and aluminas available from Akzo Chemicals Inc. under the designation Ketzen Grade B.

Supports suitable for the present invention preferably have a surface area as determined by nitrogen porosimetry using the B.E.T. method from 10 to 1000 $m^2/g$, and preferably from 100 to 600 $m^2/g$. The pore volume of the support, as determined by nitrogen adsorption, advantageously is from 0.1 to 3 $cm^3/g$, preferably from 0.2 to 2 $cm^3/g$. The average particle size depends upon the process employed, but typically is from 0.5 to 500 $\mu$m, preferably from 1 to 100 $\mu$m.

Both silica and alumina are known to inherently possess small quantities of hydroxyl functionality. When used as a support herein, these materials are preferably subjected to a heat treatment or a combination thereof chemical treatment to reduce the hydroxyl content thereof. Typical heat treatments are carried out at a temperature from 30° C. to 1000° C. (preferably 250° C. to 800° C. for 4 hours or greater) for a duration of 10 minutes to 50 hours in an inert atmosphere or air or under reduced pressure, that is, at a pressure of less than 200 Torr. When calcination occurs under reduced pressure, preferred temperatures are from 100 to 800° C. Residual hydroxyl groups are then removed via chemical treatment. Typical chemical treatments include contacting with Lewis acid alkylating agents such as trihydrocarbyl aluminum compounds, trihydrocarbylchlorosilane compounds, trihydrocarbylalkoxysilane compounds or similar agents.

The support may be functionalized with a silane or chlorosilane functionalizing agent to attach thereto pendant silane —(Si—R)═, or chlorosilane —(Si—Cl)═ functionality, wherein R is a $C_{1\text{-}10}$ hydrocarbyl group. Suitable functionalizing agents are compounds that react with surface hydroxyl groups of the support or react with the silicon or aluminum of the matrix. Examples of suitable functionalizing agents include phenylsilane, hexamethyidisilazane diphenylsilane, methylphenylsilane, dimethylsilane, diethylsilane, dichlorosilane, and dichlorodimethylsilane. Techniques for forming such functionalized silica or alumina compounds were previously disclosed in U.S. Pat. Nos. 3,687,920 and 3,879,368.

In the alternative, the functionalizing agent may be an aluminum component selected from an alumoxane or an aluminum compound of the formula $AlR^1_{x'}R^2_{y'}$, wherein:

$R^1$ independently each occurrence is hydride or $R^•$, $R^2$ is hydride, $R^•$ or $OR^•$, $R^•$ is in each occurrence is independently selected from the group consisting of hydrogen, hydrocarbyl, silyl, said $R^•$ having up to 20 non-hydrogen atoms, x' is 2 or 3, y' is 0 or 1 and the sum of x' and y' is 3.

Examples of suitable $R^1$ and $R^2$ groups include methyl, methoxy, ethyl, ethoxy, propyl (all isomers), propoxy (all isomers), butyl (all isomers), butoxy (all isomers), phenyl, phenoxy, benzyl, and benzyloxy. Preferably, the aluminum component is selected from the group consisting of tri($C_{1\text{-}4}$ hydrocarbyl)aluminum compounds. Most preferred aluminum components are trimethylaluminum, triethylaluminum, tri-isobutylaluminum, and mixtures thereof.

Such treatment typically occurs by:

(a) adding to the calcined silica sufficient solvent to achieve a slurry;

(b) adding to the slurry the agent in an amount of 0.1 to 5 mmol agent per gram of calcined silica, preferably 1 to 2.5 mmol agent per gram of calcined silica to form a treated support;

(c) washing the treated support to remove unreacted agent to form a washed support, and (d) drying the washed support by heating or a combination thereof by subjecting to reduced pressure.

Suitable support materials, also referred to as carriers or carrier materials, used in the present invention include those support materials which are typically used in the art of supported catalysts, and more in particular the art of supported olefin addition polymerization supported catalysts. Examples include porous resinous materials, for example, polyolefins such as polyethylenes and polypropylenes or copolymers of styrene-divinylbenzene, and solid inorganic oxides including oxides of Group 2, 3, 4, 13, or 14 metals, such as silica, alumina, magnesium oxide, titanium oxide, thorium oxide, as well as mixed oxides of silica. Suitable mixed oxides of silica include those of silica and one or more Group 2 or 13 metal oxides, such as silica-magnesia or silica-alumina mixed oxides. Silica, alumina, and mixed oxides of silica and one or more Group 2 or 13 metal oxides are preferred support materials. Preferred examples of such mixed oxides are the silica-aluminas. The most preferred support material is silica. The shape of the silica particles is not critical and the silica may be in granular, spherical, agglomerated, fumed or other form.

Support materials suitable for the present invention preferably have a surface area as determined by nitrogen porosimetry using the B.E.T. method from 10 to 1000 $m^2/g$, and preferably from 100 to 600 $m^2/g$. The pore volume of the support, as determined by nitrogen adsorption, is typically up to 5 $cm^3/g$, advantageously between 0.1 and 3 $cm^3/g$, preferably from 0.2 to 2 $cm^3/g$. The average particle size is not critical but typically is from 0.5 to 500 $\mu$m, preferably from 1 to 200 $\mu$m, more preferably to 100 $\mu$m.

Preferred supports for use in the present invention include highly porous silicas, aluminas, aluminosilicates, and mixtures thereof. The most preferred support material is silica. The support material may be in granular, agglomerated, pelletized, or any other physical form. Suitable materials include, but are not limited to, silicas available from Grace Davison (division of W. R. Grace & Co.) under the designations SD 3216.30, Davison Syloid™245, Davison 948 and Davison 952, and from Crosfield under the designation ES70, and from Degussa AG under the designation Aerosil™812; and aluminas available from Akzo Chemicals Inc. under the designation Ketzen™ Grade B.

Both silica and alumina are known to inherently possess small quantities of hydroxyl functionality. In the practice of the present invention, these materials are preferably subjected to a heat treatment or a combination thereof chemical treatment to reduce the hydroxyl content thereof. Typical heat treatments are carried out at a temperature from 30° C. to 1000° C. (preferably 250° C. to 800° C. for 5 hours or greater) for a duration of 10 minutes to 50 hours in an inert atmosphere or air or under reduced pressure, that is, at a pressure of less than 200 Torr. When calcination occurs under reduced pressure, preferred temperatures are from 100 to 800° C. Residual hydroxyl groups are then removed via chemical treatment. Typical chemical treatments include contacting with Lewis acid alkylating agents such as trihydrocarbyl aluminum compounds, trihydrocarbylchlorosilane compounds, trihydrocarbylalkoxysilane compounds or similar agents.

The support may be functionalized with a silane or chlorosilane functionalizing agent to attach thereto pendant silane —(Si—R)═, or chlorosilane —(Si—Cl)═ functionality, wherein R is a $C_{1-10}$ hydrocarbyl group. Suitable functionalizing agents are compounds that react with surface hydroxyl groups of the support or react with the silicon or aluminum of the matrix. Examples of suitable functionalizing agents include phenylsilane, hexamethyidisilazane diphenylsilane, methylphenylsilane, dimethylsilane, diethylsilane, dichlorosilane, and dichlorodimethylsilane. Techniques for forming such functionalized silica or alumina compounds were previously disclosed in U.S. Pat. Nos. 3,687,920 and 3,879,368, the teachings of which are herein.

To prepare the catalyst compositions of the present invention in one embodiment, the metal complex, cocatalyst, and catalyst support are slurried together in a compatible solvent, typically utilizing an amount of solvent which is greater than the pore volume of the support. The supported catalyst composition is subsequently dried while applying heat or a combination thereof vacuum to render the supported catalyst composition substantially free of solvent.

In one preferred embodiment of the invention, a sequential double impregnation technique in employed. In this preferred embodiment of the invention, the support is heated to remove water and reacted with a suitable functionalizing agent to form a support precursor. The support precursor is sequentially contacted by a first solution of either the metal complex or the cocatalyst, and thereafter by a second solution of the other of the metal complex or the cocatalyst. In each of the two contacting steps, the contacting solution will be provided in an amount such that 100 percent of the pore volume of the support precursor is at no time exceeded. Optionally, the support precursor may be dried to remove compatible solvent after contacting with the first solution. This feature, however, is not required, provided the solid remains as a dry, free-flowing powder.

In another preferred embodiment of the invention, the support is heated to remove water and reacted with a suitable functionalizing agent to form a support precursor. The support precursor is slurried in a first solution of the metal complex or the cocatalyst to form a supported procatalyst. Sufficient compatible solvent is removed from the supported procatalyst to result in a recovered supported procatalyst that is free-flowing, that is, wherein the amount of compatible solvent is less than 100 percent of the pore volume of the support precursor. Thereafter, the recovered supported procatalyst is contacted with a second solution of the other of the metal complex or cocatalyst, whereupon the second solution is provided in an amount less than 100 percent of the pore volume of the support precursor, to form the supported catalyst composition. As the amount of the second solution is insufficient to render the supported catalyst composition not free-flowing, an additional solvent removal step is unnecessary. However, if it is desired, compatible solvent may be more fully removed by application of heat, reduced pressure, or a combination thereof. In a particularly preferred embodiment, the metal complex will be applied in the first solution, and the cocatalyst will be applied in the second solution, particularly when the cocatalyst is easily degraded by the application of heat or a combination thereof vacuum during drying.

In the case of each of these preferred embodiments, and particularly in the case of the double impregnation technique, sufficient mixing should be conducted to ensure that the metal complex and cocatalyst are uniformly distributed within the pores of the support precursor, and to ensure that the support precursor remains free-flowing. Some exemplary mixing devices include rotating batch blenders, single-cone blenders, double-cone blenders, vertical conical dryers, etc.

While not wishing to be bound by theory, the catalysts compositions of the invention prior to exposure to polymerization conditions are believed to remain primarily in unaltered chemical form, that is, the metal complex and cocatalyst remain relatively unaltered and catalytically inactive until exposed to polymerization conditions. Once in the reactor at higher temperatures or a combination thereof in the presence of monomer, the catalyst composition becomes more active. Thus, catalysts with lower initial reaction exotherms and increasing rates of polymerization (rising kinetic profile) may be prepared, which may lead to improved performance in the polymerization reactor and improved polymer morphology.

The catalysts may be used to polymerize ethylenically or a combination thereof acetylenically unsaturated monomers having from 2 to 100,000 carbon atoms either alone or in combination. Preferred monomers include the $C_{2-20}$ α-olefins especially ethylene, propylene, isobutylene, 1-butene, 1-pentene, 1-hexene, 3-methyl-1-pentene, 4-methyl-1-pentene, 1-octene, 1-decene, long chain macromolecular α-olefins, and mixtures thereof. Other preferred monomers include styrene, $C_{1-4}$ alkyl substituted styrene, tetrafluoroethylene, vinylbenzocyclobutane, ethylidenenorbomene, 1,4-hexadiene, 1,7-octadiene, vinylcyclohexane, 4-vinylcyclohexene, divinylbenzene, and mixtures thereof with ethylene. Long chain macromolecular α-olefins are vinyl terminated polymeric remnants formed in situ during continuous solution polymerization reactions. Under suitable processing conditions such long chain macromolecular units are readily polymerized into the polymer product along with ethylene and other short chain olefin monomers to give small quantities of long chain branching in the resulting polymer. Highly desirable α-olefin polymers prepared by use of the catalyst compositions of the present invention have reverse molecular molecular architecture, by which is meant that a copolymer of two or more olefins contains increased content of the higher molecular weight comonomer in the higher molecular weight fractions thereof.

In general, the polymerization may be accomplished at conditions well known in the prior art for Ziegler-Natta or Kaminsky-Sinn type polymerization reactions, such as temperatures from 0–250° C. and pressures from atmospheric to 1000 atmospheres (0.1 to 100 MPa. Typically, best practices will be employed, that is, feed streams shall be appropriately dried and deoxygenated to remove impurities; temperature controls shall be in place to minimize reaction exotherm and prevent runaway reactions; suitable scavengers will be employed as needed, for instance, alkyl-aluminum treated silica, potassium hydride, etc. Suitable gas phase reactions may utilize condensation of the monomer or monomers employed in the reaction, or of an inert diluent to remove heat from the reactor.

The support is preferably employed in an amount to provide a weight ratio of catalyst (based on metal):support from 1:100,000 to 1:10, more preferably from 1:50,000 to 1:20, and most preferably from 1:10,000 to 1:30.

In most polymerization reactions the molar ratio of catalyst:polymerizable compounds employed is from $10^{-12}$:1 to $10^{-1}$:1, more preferably from $10^{-12}$:1 to $10^{-5}$:1.

The catalysts may also be utilized in combination with at least one additional homogeneous or heterogeneous polymerization catalyst in the same or in separate reactors connected in series or in parallel to prepare polymer blends having desirable properties. An example of such a process is disclosed in WO 94/00500, equivalent to U.S. Ser. No. 07/904,770, as well as U.S. Ser. No. 08/10958, filed Jan. 29, 1993, the teachings of which are hereby herein.

The following metal complexes which have been found to be preferred in the practice of the claimed invention will correspond to the formula:

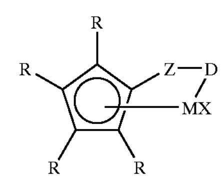

wherein:

M is titanium or zirconium in the +2 or +4 formal oxidation state;

X is diphenylbutadiene, or 1,6-diphenyl-2,4-hexadiene;

D is —NR—; and

Z is $SiR_2$, and R is in each occurrence is independently selected from the group consisting of hydrogen, hydrocarbyl, silyl, germyl, cyano, halo and combinations thereof, said R having up to 20 non-hydrogen atoms, or adjacent R groups together form a divalent derivative (that is, a hydrocarbadiyl, siladiyl or germadiyl group) thereby forming a fused ring composition.

Those of these preferred metal complexes in which M is titanium and Z is $SiMe_2$ and D is N-t-butyl are especially useful in the practice of the claimed invention.

In another aspect, the following cocatalysts, formed as the reaction of a organometal compound, especially a tri($C_{1-6}$alkyl)aluminum compound with an ammonium salt of a hydroxyaryltris(fluoroaryl)borate compound, have been found to be preferred for use in the practice of the claimed invention. Such cocatalysts may be advantageously capped to form organometaloxyaryltris(fluoroaryl)borate compounds which renders them insoluble in hexane, and facilitates their precipitation onto the support, typically silica, alumina or trialkylaluminum passivated silica. These cocatalysts have been previously disclosed in WO 98/27119. An especially preferred cocatalyst for use in the practice of the claimed invention include the reaction product of a tri($C_{1-6}$ alkyl)aluminum compound with the ammonium salt of diethylaluminumoxyaryltris(perfloroaryl)borate.

EXAMPLES

Unless otherwise stated, all manipulations were carried out in an inert atmosphere either in an argon-filled glove box or under nitrogen using Schlenk techniques.

Reagents (t-butylamido)(tetramethyl-$\eta^5$-cyclopentadienyl)dimethylsilanetitanium (II) $\eta^4$-1,3-pentadiene and (t-butylamido)(tetramethyl-$\eta^5$-cyclopentadienyl)dimethylsilanetitanium (II) 1,4-diphenyl-1,3-butadiene were prepared as described in U.S. Pat. No. 5,470,993 examples A2 and 17, respectively. Bis(hydrogenated tallow alkyl)methyl ammonium tris(pentafluorophenyl)(4-hydroxyphenyl)borate, was prepared as described in PCT98/27119. ISOPAR®E hydrocarbon mixture was obtained from Exxon chemical company. All other solvents were purchased from Aldrich Chemical Company as anhydrous reagents and were further purified by a nitrogen purge and by passing them down a 12 inch column chunk alumina which had been heat treated overnight at 250° C. All other reagents were purchased from Aldrich Chemical Company and used without further purification.

Preparation of TEA-Treated 948 Silica

A 200 g sample of Davison 948 silica (available from Grace-Davison) was calcined for 4 hours at 250° C. in air, then transferred to a nitrogen-filled glove box. A 15 g sample of the silica was slurried in 90 mL hexane, and 30 mL of a 1.0 M solution of triethylaluminum in hexanes was added over several minutes. The addition rate was slow enough to prevent solvent reflux. The slurry was agitated on a mechanical shaker for 1 hour. At this time, the solids were collected on a fritted funnel, washed three times with 50 mL portions of hexanes, and dried in vacuo.

1. Preparation of a 40/40 $\mu$mol/g $[C_5Me_4SiMe_2N^LBu]Ti$ (B1NB)/AM2HT on TEA/silica A. Preparation of 1,4-bis(1-naphthyl)butadiene (B1NB)

3-(1-naphthalenyl)-2-propenoyl chloride 3-(1-Naphthalenyl)-2-Propenoic acid (7.5 g, 0.038 mol) was slurried in 15 ml of oxalyl chloride and refluxed for 2 hr. The resulting solution was evaporated to yield 8.0 g (99 percent) of yellow solid.

3-(1-naphthalenyl)-2-propenal

To a stirred solution of 3-(1-naphthalenyl)-2-propenoyl chloride (2.5 g, 0.012 mol) and 6.03 g (0.023 mol) of triphenyl phosphine in 50 ml of acetone was added 7.65 g (0.013 mol) of bis(triphenylphosphine)tetrahydroboratocopper in one portion. After an hour the solution was filtered and the filtrate was evaporated to dryness. The residue was dissolved in 20 ml of chloroform and treated with 6 g of cuprous chloride, allowed to stir for an hour and filtered. The solvent was evaporated to dryness to yield 1.66 g (79 percent) of solid.

1,4-bis(1-naphthyl)butadiene

To a stirred solution of 1-naphthylmethyltriphenylphophonium chloride (3.98 g, 0.009 mol) in 30 ml of benzene was added a ether/cyclohexane solution of phenyl lithium (5 ml, 0.009 mol) and allowed to stir for 30 min. A solution of 3-(1-naphthyl) propenal (1.61 g, 0.009 mol) in 10 ml of benzene was added and the mixture was stirred for 14 hr. The mixture was filtered and the precipitate was digested with toluene and filtered. The filtrate was concentrated to yield a yellow solid (1.2 g, 45 percent) which was an~5:1 mixture of the trans,trans: cis-trans isomers. The trans,trans isomer was selectively recrystallized from toluene (400 mg).

B. Preparation of $[C_5Me_4SiMe_2N'Bu]Ti$(B1NB)

A 50 mL flask was charged with $[C_5Me_4SiMe_2N'Bu]TiCl_2$ (238 mg, 0.646 mmol), 1,4-bis(1-naphthyl)butadiene (198 mg, 0.646 mmol), and 35 mL of hexanes. To the yellow slurry was added n-BuLi via syringe at 25° C. (0.53 mL, 2.5 M, 1.33 mmol). Immediate formation of a brown mixture was observed. After stirring for 15 minutes, the mixture was refluxed for 2 hours. The red/brown mixture was cooled slightly and then filtered through Celite™ filter aid on a frit funnel. The filter cake was washed once with 10 mL of hexanes. The volatiles were removed from the red filtrate and the solid recrystallized from hexanes to give 163 mg (42 percentyield) of brick red solid.

C. Preparation of a 40/40 $\mu$mol/g $[C_5Me_4SiMe_2N^LBu]Ti$ (B1NB)/AM2HT on TEA/silica A slurry of TEA-treated silica (prepared as described above, 2.50 g) in 4 mL of toluene was treated with a mixture of armeenium (p-hydroxyphenyl)tris(pentafluorophenyl)borate (2.5 mL. 0.040 M, 100 mmol) and TEA (1.1 mL, 0.10 M, 110 mmol) (Thereby forming armeenium (diethylaluminumoxyphenyl)tris(pentafluorophenyl)borate (AM2HT) in situ.) The slurry was vigorously shaken for 20 seconds and then a solution of the [(tert-butylamido) (dimethyl)(tetramethylcyclopentadienyl)silane] titanium bis(1-naphthyl)butadiene in toluene (5.0 mL, 0.020 M, 100 mmol) was added. The mixture was swirled vigorously for 1 minute and then the volatiles were removed in vacuo to give 2.58 g of a free-flowing red/brown solid.

2. Preparation of a 40/40 $\mu$mol/g $[C_5Me_4SiMe_2N^LBu]Ti$ (DBB)/AM2HT on TEA/silica A. Preparation of 1,4-Dibenzylbutadiene (DBB)

Under an argon atmosphere, diisobutylaluminum (DIBAL-H) (82.5 mL, 1.0M, 82.5 mmol) was added via a dropping funnel to a solution of 3-phenylpropyne (9.55 g, 82.2 mmol) in 40 mL of hexanes at 25° C. The solution was stirred for 20 minutes then heated to 56° C. for 4 hours. After cooling, the volatiles were removed in vacuo and approximately 125 mL of cold THF was slowly added. To the solution was added solid CuCl (9.77 g, 98.7 mmol) over a 5 minute period. The resulting black mixture was stirred for 1 hr. and then poured into a mixture of hexanes and dilute HCl. The organic layer was separated and the aqueous layer extracted 3× with 150 mL hexanes. The combined organic layers were washed with saturated $NaHCO_3$ and dried over anhydrous $Na_2SO_4$. Removal of the volatiles gave a yellow/green solid. Recrystallization from hot hexanes gave 4.4 g of pale yellow crystals (46 percent yield).

B. Preparation of $[C_5Me_4SiMe_2N^LBu]Ti(DBB)$

Under an inert argon atmosphere, a 50 mL flask was charged with $[C_5Me_4SiMe_2N^LBu]TiCl_2$ (238 mg, 0.646 mmol), 1,4-dibenzylbutadiene (198 mg, 0.646 mmol), and 35 mL of hexanes. To the yellow slurry was added n-BuLi via syringe at 25° C. (0.53 mL, 2.5 M, 1.33 mmol). Immediate formation of a brown mixture was observed. After stirring for 15 minutes, the mixture was refluxed for 2 hours. The red/brown mixture was cooled slightly and then filtered through diatomaceous earth filter aid on a frit funnel. The filter cake was washed once with 10 mL of hexanes. The volatiles were removed from the red filtrate and the solid recrystallized from hexanes to give 163 mg (42 percentyield) of brick red solid.

C. Preparation of a 40/40 μmol/g $[C_5Me_4SiMe_2N'Bu]Ti$ (DBB)/AM2HT on TEA/silica A slurry of TEA-treated silica (prepared as described above, 2.00 g) in 5 mL of toluene was treated with a mixture of armeenium (p-hydroxyphenyl)trispentafluorophenyl)borate (2.0 mL. 0.040 M, 80 mmol) and TEA (0.88 mL, 0.10 M, 88 mmol). The slurry was vigorously shaken for 30 seconds and then a solution of the [(tertbutylamido) (dimethyl)(tetramethylcyclopentadienyl)silane] titanium 1,4-dibenzylbutadiene in toluene (4.0 mL, 0.020 M, 80 mmol) was added. The mixture was swirled vigorously for 1 minute and then the volatiles were removed in vacuo to give 2.08 g of a free-flowing brick red solid.

D. Preparation of a 30/30 μmol/g $[C_5Me_4SiMe_2N^LBu]Ti$ (DBB)/AM2HT on TEA/silica To 2.86 g of TEA-treated silica prepared as described above was added a mixture of AM2HT (1.2 mL. of a 9.95 wt percent solution diluted to 3 mL) and TEA (0.05 mL of a 1.9 M solution in toluene). The mixture was vigorously agitated to a free flowing powder, and the solvent was removed in vacuo. Next, (t-butylamido)(dimethyl)(tetramethylcyclopentadienyl)silane titanium 1,4-dibenzylbutadiene (3.80 mL of a 0.023 M solution in toluene) was added. The mixture was agitated vigorously to a free flowing powder and then the volatiles were removed in vacuo.

3. Preparation of $[C_5Me_4SiMe_2N^LBu]Ti$(1,4-diphenyl-1,3-butadiene) and $[C_5Me_4SiMe_2N^LBu]Ti$(1,3-pentadiene) catalysts with AM2HT on TEA/silica A. Preparation of 30/30 μmol/g $[C_5Me_4SiMe_2N^LBu]Ti$(1,4-diphenyl-1,3-butadiene)/AM2HT catalyst To 4.0 mL of a 0.040 M solution of armeenium (p-hydroxyphenyl)tris(pentafluoro-phenyl)borate in toluene was added 0.1 mL of a 1.9 M $Et_3Al$ solution in toluene. This solution was mixed for 1 minute, then was added to 4.04 g $Et_3Al$-treated Davison 948 silica, prepared as described above, in 10 mL toluene. To this slurry was added 3.2 mL of a 0.05 M (t-butylamido)(tetramethyl-$\eta^5$-cyclopentadienyl) dimethylsilanetitanium (II) 1,4-diphenyl-1,3-butadiene solution in toluene. The solvent was removed under vacuum to give a free flowing, red/brown solid.

B. Preparation of30/30 μmol/g $[C_5Me_4SiMe_2N^LBu]Ti$(1,3-pentadiene)/AM2HT catalyst To 3 mL of a 0.040 M solution of armeenium p-hydroxyphenyltris(pentafluorophenyl)borate in toluene was added 70 μL of a 1.9 M $Et_3Al$ solution in toluene. This solution was mixed for 30 seconds, then was added to 3.0 g $Et_3Al$-treated Davison 948 silica, prepared as described above, in 12 mL toluene. To this slurry was added 0.55 mL of a 0.22 M (t-butylamido)(tetramethyl-$\eta^5$-cyclopentadienyl)dimethylsilanetitanium (II) $\eta^4$-1,3-pentadiene solution in toluene. The combined mixture was slurried briefly (<1 minute), and the solvent was removed under vacuum to give a free flowing, green/brown solid.

4. Polymerizations

A 2.5-L stirred, fixed bed autoclave was charged with 200 g dry NaCl containing 0.67 g TEA/silica, and stirring was begun at 300 rpm. The reactor was pressurized to 7 bar ethylene and heated to 70° C. 1-hexene was introduced to a level of 8000 ppm as measured by mass 84 on a mass spectrometer. In a separate vessel, 0.1 g catalyst was mixed with an additional 0.5 g scavenger. The combined catalyst and scavenger were subsequently injected into the reactor. Ethylene pressure was maintained on a feed as demand, and hexene was fed as a liquid to the reactor to maintain the ppm concentration. Temperature was regulated by a heating bath with cold water bypass. After 90 minutes the reactor was depressurized, and the salt and polymer were removed via a dump valve. The polymer was washed with copious distilled water to remove the salt, then dried at 50° C. Activity values were calculated based on ethylene uptake. The results for the catalysts prepared above were given in the following Table I.

TABLE I

| Run | Catalyst # | Metal Complex | A30[a] | A90[a] | $K_r$ | Exotherm (° C.) |
|---|---|---|---|---|---|---|
| 1* | 3B | CGC(PD)[1] | 94 | 53 | 1.77 | 30 |
| 2 | 3A | CGC(DPB)[2] | 86 | 89 | 0.97 | 7 |
| 3 | 2D | CGC(DBB)[3] | 133 | 96 | 1.39 | 6 |
| 4 | 2C | CGC(DBB) | 130 | 105 | 1.24 | 5.8 |
| 5 | 2C | CGC(DBB) | 179 | 121 | 1.48 | 6.8 |
| 6 | 1C | CGC(B1NB)[4] | 201 | 125 | 1.61 | 31.5 |
| 7 | 1C | CGC(B1NB) | 203 | 124 | 1.64 | 32 |
| 8 | 1C | CGC(B1NB) | 163 | 96 | 1.70 | 22.4 |

*comparative, not an example of the invention

[a]units were grams polymer/gram supported catalyst composition · time (hr) · ethylene pressure (100 kPa)

[1](t-butylamido)dimethyl(tetramethylcyclopentadienyl)silanetitanium 1,3-pentadiene[1].

[2](t-butylamido)dimethyl(tetramethylcyclopentadienyl)silanetitanium 1,4-diphenyl-1,3-butadiene

[3](t-butylamido)dimethyl(tetramethylcyclopentadienyl)silanetitanium 1,4-dibenzyl-1,3-butadiene

[4](t-butylamido)dimethyl(tetramethylcyclopentadienyl)silanetitanium 1,4-dinaphthyl-1,3-butadiene As set forth in Table 1, catalyst systems 3A, 2C, and 2D each exhibitied a $K_r$ of less than 1.6. In turn, each of these catalyst compositions exhibited a less decaying profile than that of comparative catalyst compositions 3B and 1C.

We claim:

1. A process for the polymerization of ethylene in the gas phase which comprises contacting ethylene in a gas phase polymerization reactor with a polymerization catalyst under gas phase polymerization conditions, wherein said polymerization catalyst comprises:

(a) a metal complex which corresponds to the formula:

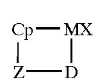

wherein Cp is an anionic, delocalized, π-bonded group that is bound to M, containing up 50 nonhydrogen atoms;

M is a metal of Group 4 of the Periodic Table of the Elements in the +2 or +4 formal oxidation state;

X is a $C_{4-30}$ conjugated diene represented by the formula:

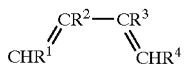

wherein $R^1$ and $R^4$ are each a benzyl radical or a substituted benzyl radical, a phenyl radical or a substituted phenyl radical and $R^2$ and $R^3$ are each independently a hydrogen, aromatic, substituted aromatic, fused aromatic, substituted fused aromatic, aliphatic, substituted aliphatic, heteroatom-containing aromatic, heteroatom-containing fused aromatic, or silyl radical;

D is —O—, —S—, —NR—, or —PR—; and

Z is $SiR_2$, $CR_2$, $SiR_2SiR_2$, $CR_2CR_2$, CR═CR, $CR_2SiR_2$, or $GeR_2$, wherein R is in each occurrence independently selected from the group consisting of hydrogen, hydrocarbyl, silyl, germyl, cyano, halo and combinations thereof, said R having up to 20 nonhydrogen atoms, or adjacent R groups together form a hydrocarbadiyl, siladiyl or germadiyl group thereby forming a fused ring system;

(b) a cocatalyst represented by the formula:

$$[L^*\text{-}H]^+[(C_6F_5)_3BC_6H_4\text{—O—}AlR^C_{x-1}X^a_y]^-,$$

wherein

L* is a neutral Lewis base, $R^c$ independently each occurrence is a hydrogen or a hydrocarbyl, hydrocarbylsilyl, or hydrocarbylsilylhydrocarbyl group having from 1 to 80 nonhydrogen atoms;

$X^a$ is a halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide noninterfering group having from 1 to 100 nonhydrogen atoms;

x is an integer which ranges from 1 to an integer equal to the valence of Al;

y is an integer which ranges from 0 to an integer equal to 1 less than the valence of Al; and x+y equals the valence of Al; and (c) a support for the metal complex and the cocatalyst, wherein the polymerization catalyst, when injected into the gas phase polymerization reactor, and contacted with the ethylene, demonstrates a kinetic profile which obeys the following inequality:

$$Kr = A_{30}/A_{90} \leq 1.6$$

where Kr is the ratio of the cumulative net catalyst activity at 30 minutes after the onset of polymerization ($A_{30}$) divided by the cumulative net catalyst activity at 90 minutes after the onset of polymerization ($A_{90}$) and wherein $A_{30}$ and $A_{90}$ are determined by calculating the grams polymer/gram polymerization catalyst×time (hr)×total ethylene pressure (100 kPa).

2. The process of claim 1, wherein the metal complex corresponds to the formula:

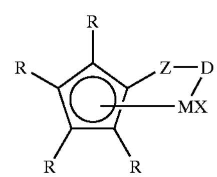

wherein M is titanium, zirconium or hafnium in the +2 or +4 formal oxidation state.

* * * * *